United States Patent
Zoller

(10) Patent No.: US 6,894,126 B2
(45) Date of Patent: May 17, 2005

(54) METHOD FOR PRODUCING ETHYLENE HOMOPOLYMERS AND COPOLYMERS BY MEANS OF RADICAL HIGH PRESSURE POLYMERIZATION

(75) Inventor: Wilhelm Zoller, Oberhausen (DE)

(73) Assignee: Basell Polyolefine GmbH (DE)

( * ) Notice: Subject to any disclaimer, the term of this patent is extended or adjusted under 35 U.S.C. 154(b) by 4 days.

(21) Appl. No.: 10/480,244

(22) PCT Filed: Jun. 4, 2002

(86) PCT No.: PCT/EP02/06074

§ 371 (c)(1),
(2), (4) Date: Dec. 9, 2003

(87) PCT Pub. No.: WO02/100907

PCT Pub. Date: Dec. 19, 2002

(65) Prior Publication Data

US 2004/0220358 A1 Nov. 4, 2004

(30) Foreign Application Priority Data

Jun. 11, 2001 (DE) ........................ 101 28 221

(51) Int. Cl.⁷ ................................. C08F 2/38
(52) U.S. Cl. ...................... 526/64; 526/65; 526/348; 526/352
(58) Field of Search ............... 526/64, 65, 348, 526/352

(56) References Cited

U.S. PATENT DOCUMENTS 4,082,910 A    4/1978  Buechner et al.
4,175,169 A  * 11/1979  Beals et al. .................. 526/64

FOREIGN PATENT DOCUMENTS

| DE | 29 24 750  | 1/1980  |
| DE | 31 41 507  | 4/1983  |
| DE | 41 02 808  | 8/1992  |
| DE | 100 21 886 | 11/2001 |
| DE | 100 64 752 | 7/2002  |
| DE | 198 29 399 | 7/2002  |
| DK | 146 298    | 2/1981  |
| DK | 151 069    | 9/1981  |
| DK | 151 070    | 9/1981  |
| EP | 0 101 875  | 3/1984  |
| EP | 0 534 237  | 3/1993  |
| FR | 1 417 413  | 11/1965 |

\* cited by examiner

*Primary Examiner*—William K. Cheung
(74) *Attorney, Agent, or Firm*—Connolly Bove Lodge & Hutz LLP

(57) ABSTRACT

The invention relates to a process for preparing ethylene homopolymers and ethylene copolymers in a tube reactor at pressures above 1000 bar and temperatures in the range from 120 to 400° C. by free-radical addition polymerization, in which first small amounts of free-radical chain initiator are supplied to a streaming flow medium comprising ethylene, molar mass regulator, and, if desired, polyethylene, after which the polymerization takes place. The invention takes place at a pressure in the range from 2000 to 3500 bar and comprises reaction mixture within the tube reactor passing through a temperature profile in the range from 100 to 350° C.

7 Claims, No Drawings

METHOD FOR PRODUCING ETHYLENE HOMOPOLYMERS AND COPOLYMERS BY MEANS OF RADICAL HIGH PRESSURE POLYMERIZATION

Polyethylene is prepared by polymerizing ethylene by one of two fundamentally different methods, the high-pressure process and the low-pressure/medium-pressure process. The low-pressure/medium-pressure process can be conducted as a solution polymerization, a suspension/emulsion polymerization or a gas-phase polymerization. The high-pressure process is conducted at pressures above 1500 bar (corresponding to 150–400 MPa) and proceeds by a free-radical mechanism.

Generally speaking, the low-pressure/medium-pressure process is conducted at pressures below 100 bar, and is generally catalyzed. In contrast to the products of the high-pressure process, which exhibit a high level of branching, relatively low crystallinity, and low density, products from the low-pressure/medium-pressure process are usually of a linear structure with little branching and possess a high level of crystallinity (generally 60–90%), a high melting range (typically 120–135° C.), and a high density (generally 0.93–0.97 g/cm$^3$). High density in a polyethylene is normally associated at the same time with a high glass transition temperature, high hardness, a high melting range, high brittleness, and low tackiness. The above properties generally characterize low-pressure/medium-pressure polyethylene.

Since, however, from the applications standpoint these properties are not always required in every case, the low-density polyethylene (LDPE) prepared by the high-pressure process in tube reactors continues to be a standard polymer for which a very high level of demand is still being recorded worldwide, since the material is less brittle and for numerous applications is simply easier to process.

For this reason, the high-pressure polymerization process continues to be an established process for preparing low-density polyethylene (LDPE), and is carried out industrially with great success in numerous plants worldwide. In the case of high-pressure polymerization, the reaction is normally initiated by atmospheric oxygen or by peroxides or by other free-radical initiators or by mixtures of these. For this purpose, the free-radical chain initiators used to initiate the polymerization must be added to the reaction medium in some appropriate way.

The text below, therefore, will consider the high-pressure polymerization of ethylene where use is also made of comonomers such as vinyl acetate, vinyl esters, olefinically unsaturated carboxylic acids or alpha-olefins. This is a copolymerization reaction in which the crystallinity of the resulting product can be controlled specifically by varying the amount of comonomer in the monomer mixture. The Uhde GmbH brochure "engineering news 4–94" presents schematically under the title "The advanced Ruhrchemie Process" a process in which fresh ethylene is first subjected to low-pressure compression and then, together with recycle, which has not been consumed in the actual polymerization reaction, with initiators, moderators, and comonomers, is brought to reaction pressure in a high-pressure compressor. The actual polymerization reaction then takes place in a tube reactor, which is constructed as a double-tube heat exchanger.

The reaction gas is first heated to a temperature in the range from 90 to 200° C. in order to initiate the highly exothermic polymerization reaction. The heat of reaction liberated is taken off by water cooling, with up to 40% of the monomers used being converted to polymer in one pass through the continuously operated reactor.

The polymer formed is deposited in a two-stage process comprising a high-pressure separation and a low-pressure separation. First of all, by a reduction in pressure to about 180–350 bar, unused reaction gas is very largely separated off from the polymer which has formed, and, after cooling and purification, is recycled to the polymerization reaction (as the abovementioned recycle). The polymer arriving at the low-pressure separation stage is then freed from the remainder of the unreacted reaction gases by further reduction in pressure to 1–5 bar. The gases are passed back again, while the resulting polymer is supplied to a melt extruder, homogenized, and then pelletized.

A disadvantage, however, is that the polymer prepared in this way has a certain tendency to form gel specks.

It is an object of the present invention, therefore, to conduct the high-pressure polymerization of ethylene and further comonomers in such a way that, by optimizing the way in which the reactor is cooled, the reaction temperature, and the distribution of cooling water, a greater throughput is achieved without detriment to the quality of the polymer thus prepared.

We have found that this object is achieved by a process for the high-pressure polymerization of ethylene in a tube reactor, constructed as a double-tube heat exchanger, in which fresh ethylene is first subjected to low-pressure compression and then, together with recycle, initiators, moderators, and comonomer, is brought to reaction pressure in a high-pressure compressor, which comprises conducting the polymerization at a pressure in the range from 2000 to 3500 bar and comprises reaction mixture within the tube reactor passing through a temperature profile in the range from 100 to 350° C.

The reaction mixture, comprising inert gas, molar mass regulator, ethylene, and comonomer, is preferably first compressed to a pressure of 2800 bar and then heated to a temperature of 120° C. The hot reaction mixture is then fed into the tube reactor, in which, right at the beginning, the peroxide initiator is added in an amount of from 10 to 400 ppm, based on the weight of the reaction mixture, by way of high-pressure piston pumps. The exothermic polymerization reaction, which begins immediately, liberates heat of reaction which must be rapidly taken off by water cooling, since otherwise the reaction mixture would suffer excessive overheating and there would be a danger of uncontrolled decomposition of the ethylene. In accordance with the invention, cooling is conducted such that the reactor as a whole is divided lengthwise into two zones. The first zone encompasses the front two thirds of the overall tube reactor length, the second zone the last third of the overall tube reactor length. Both zones of the reactor are cooled separately with water at different temperatures, the preferred water temperature for the preparation of ethylene homopolymer in the two zones being calculated in accordance with the following formula:

$$T(H_2O) [° C.] \text{ zone } 1 = 200 - 7.77 \cdot MFR$$

and $$T(H_2O) [° C.] \text{ zone } 2 = 159 - 7.62 \cdot MFR,$$

MFR denoting the melt index of the product obtained at the end of the reactor, in [dg/min], measured in accordance with ASTM D-1238, Condition (E), i.e., at a temperature of 190° C. under an applied weight of 2.16 kg.

The inventively preferred water temperature for the preparation of ethylene copolymer with vinyl acetate in the two zones is calculated according to the following formula:

$$T(H_2O) \, [°\text{C.}] \, \text{zone } 1 = 130 - 1.77 \cdot \text{MFR}$$

and $$T(H_2O) \, [°\text{C.}] \, \text{zone } 2 = 120 - 3.0 \cdot \text{MFR},$$

MFR likewise denoting the melt index of the product obtained at the end of the reactor, in [dg/min], measured in accordance with ASTM D-1238, Condition (E), i.e., at a temperature of 190° C. under an applied weight of 2.16 kg.

At the end of the tube reactor the reaction mixture is cooled and substantially freed from volatile constituents by lowering the pressure to a figure in the range between 10 to 70 MPa. Thereafter the polymer melt is freed from the remaining adhering reaction gases as described above, by further pressure reduction to 1–5 bar, and is homogenized in an extruder, pelletized, and packed.

Surprisingly it has been found that, by observing the inventively prescribed temperature profile during the polymerization, heat transfer is improved, and that the reactor yield can be increased as a result.

As molar mass regulators it is possible in accordance with the invention to use customary polar or apolar organic compounds such as ketones, aldehydes, alkanes or alkenes having 3 to 20 carbon atoms. Preferred molar mass regulators are acetone, methyl ethyl ketone, propionaldehyde, propane, propene, butane, butene, and hexene.

As free-radical chain initiators it is possible inventively to use peroxides such as aliphatic diacyl ($C_3$ to $C_{12}$) peroxides, tert-butyl peroxypivalate (TBPP), tert-butyl peroxy-3,5,5-trimethylhexanoate (TBPIN), di-tert-butyl peroxide (DTBP), tert-butyl perisononoate or mixtures or solutions of these in suitable solvents. The free-radical chain initiators are supplied inventively in amounts in the range from 10 to 1000 g/t of PE produced, preferably from 100 to 600 g/t of PE produced.

The streaming flow medium to which the abovementioned free-radical initiators are supplied in accordance with the invention may include, in addition to ethylene, 1-olefin comonomer(s) having 3 to 20 carbon atoms, preferably having 3 to 10 carbon atoms, in an amount in the range from 0 to 10% by weight, based on the amount of ethylene monomer, preferably in an amount in the range from 1 to 5% by weight. Additionally, the streaming flow medium may in accordance with the invention comprise polyethylene in an amount in the range from 0 to 40% by weight, based on the total weight of the monomers, preferably from 1 to 30% by weight.

In one particularly preferred variant of the process of the invention the free-radical chain initiators are supplied to a region of the tube reactor in which by virtue of a reduction in the diameter of the tube reactor to a level of approximately 0.6 to 0.9 times the diameter D of the reactor in the feed zone the flow rate of the streaming flow medium is increased to from 1.2 to 2.8 times, preferably from 1.8 to 2.5 times, the flow rate within the feed zone of the tube reactor. Expressed in absolute figures, the flow rate of the streaming flow medium in the region of supply of the free-radical chain initiators is situated inventively in the range from 10 to 40 m/s, preferably from 15 to 30 m/s, more preferably from 20 to 25 m/s.

The process of the invention has the advantage that stable reactor operation can be maintained at unusually high maximum temperatures of up to 350° C. without any inclination toward decomposition.

A further advantage of the process of the invention can be seen in the fact that the polymerization is initiated at lower temperatures and that thereafter the temperature rise of the reaction mixture takes place in a controlled manner. This allows better exploitation, for the polymerization and hence for the preparation of LDPE, of the lifetime of the free-radical chain initiators, which commonly have only a relatively short half-life.

Practical tests conducted show that, as a result of the process of the invention, the conversion and, in particular, the product properties such as density and MFR are improved. In accordance with the invention it was possible to lower the amount of free-radical chain initiator used by about 15%, and the consistency of operation of the tube reactor was increased.

EXAMPLE

In a tube reactor with an L/D ratio of 30 000 an amount of 28.5 ppm of di-tert-butyl peroxy-2-ethylhexanoate and 200 ppm of hexane (solvent) were injected at the reactor entry, after heating to a temperature of 150° C., into a mixture of 98% by volume ethylene, 1.5% by volume propylene as moderator and 1.5 ppm oxygen. In the first reaction zone the temperature of the cooling water was set at 195° C., while in the second reaction zone the water temperature was reduced to 154° C. by further addition of cooling water. The pressure within the reactor was 233 MPa (=2330 bar).

The polyethylene, worked up conventionally at the end of the reactor, had a density of 0.924 g/cm$^3$ and an MFR of 0.65 dg/min.

What is claimed is:

1. A process for preparing ethylene homopolymers and ethylene copolymers in a tube reactor by free-radical addition polymerization, in which first small amounts of free-radical chain initiator are supplied to a streaming flow medium comprising ethylene, molar mass regulator, and, if desired, polyethylene, after which the polymerization is then carried out, in which the polymerization is conducted at a pressure in the range from 2000 to 3500 bar and in which the reaction mixture within the tube reactor passes through a temperature profile in the range from 100 to 350° C., wherein the heat of reaction, liberated immediately, is taken off by water cooling, and wherein the water cooling is set up, for the preparation of ethylene homopolymer, in two zones, of which zone 1 encompasses the front two thirds of the total length of the tube reactor and of which zone 2 encompasses the last third of the total length of the tube reactor, the preferred water temperature for the cooling being calculated in accordance with the following formula:

$$T(H_2O) \, [°\text{C.}] \, \text{zone } 1 = 200 - 7.77 \cdot \text{MFR}$$

and $$T(H_2O) \, [°\text{C.}] \, \text{zone } 2 = 159 - 7.62 \cdot \text{MFR},$$

MFR denoting the melt index of the homopolymer obtained at the end of the reactor, in [dg/min], measured in accordance with ASTM D-1238, Condition (E).

2. A process as claimed in claim 1, wherein the water cooling is set up, for the preparation of ethylene copolymer, in two zones, of which zone 1 encompasses the front two thirds of the total length of the tube reactor and of which zone 2 encompasses the last third of the total length of the tube reactor, the preferred water temperature for the cooling being calculated in accordance with the following formula:

$$T(H_2O) \, [^\circ C.] \text{ zone } 1 = 130 - 1.77 \cdot MFR$$

and $$T(H_2O) \, [^\circ C.] \text{ zone } 2 = 120 - 3.0 \cdot MFR,$$

MFR denoting the melt index of the copolymer obtained at the end of the reactor, in [dg/min], measured in accordance with ASTM D-1238, Condition (E).

3. A process as claimed in claim 1, wherein the reaction mixture, comprising inert gas, molar mass regulator, ethylene, and comonomer, is first compressed to a pressure of 2800 bar and then heated to a temperature of 120° C.

4. A process as claimed in claim 3, wherein the hot reaction mixture is then fed into the tube reactor, in which, immediately, peroxide initiator is added in an amount of from 10 to 400 ppm, based on the weight of the reaction mixture, by way of high-pressure piston pumps.

5. A process as claimed in claim 1, wherein following its emergence from the reactor the polymer melt is freed from unreacted reaction gases by gradual pressure release, and is pelletized and packed.

6. A process as claimed in claim 1, wherein molar mass regulators used are polar or apolar organic compounds such as ketones, aldehydes, alkanes or alkenes having 3 to 20 carbon atoms, preferably acetone, methyl ethyl ketone, propionaldehyde, propane, propene, mbutane, butene or hexene.

7. A process as claimed in claim 1, wherein as free-radical chain initiators peroxides such as tert-butyl peroxypivalate (TBPP), tert-butyl peroxy-3,5,5-trimethylhexanoate (TBPIN), di-tert-butyl peroxide (DTBP), tert-butyl perisononoate or mixtures or solutions of these in suitable solvents are supplied in amounts in the range from 10 to 1000 g/t of PE produced, preferably from 100 to 600 g/t of PE.

* * * * *